(12) United States Patent
Min et al.

(10) Patent No.: US 7,773,493 B2
(45) Date of Patent: Aug. 10, 2010

(54) PROBE-BASED STORAGE DEVICE

(75) Inventors: Kyu Min, San Jose, CA (US); Qing Ma, San Jose, CA (US); Nathan R. Franklin, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 985 days.

(21) Appl. No.: 11/540,271

(22) Filed: Sep. 29, 2006

(65) Prior Publication Data

US 2008/0089108 A1    Apr. 17, 2008

(51) Int. Cl.
G11B 9/00      (2006.01)
G11C 13/04    (2006.01)
G11C 13/00    (2006.01)

(52) U.S. Cl. .................. 369/126; 365/110; 365/151; 257/530

(58) Field of Classification Search ........... 369/126, 369/145, 13.01, 13.02, 101; 257/528, 529, 257/530; 438/131–132, 215, 281, 333, 467, 438/601, 260, 261, 962; 365/115
See application file for complete search history.

(56) References Cited

U.S. PATENT DOCUMENTS

| | | | | |
|---|---|---|---|---|
| 5,132,934 A | * | 7/1992 | Quate et al. | 369/126 |
| 6,060,743 A | * | 5/2000 | Sugiyama et al. | 257/321 |
| 6,090,666 A | * | 7/2000 | Ueda et al. | 438/257 |
| 6,413,819 B1 | * | 7/2002 | Zafar et al. | 438/257 |
| 6,605,520 B2 | * | 8/2003 | Cheong | 438/592 |
| 6,927,136 B2 | * | 8/2005 | Lung et al. | 438/288 |
| 6,972,467 B2 | | 12/2005 | Zhang et al. | 257/401 |
| 7,361,567 B2 | * | 4/2008 | Rao et al. | 438/369 |
| 2003/0107953 A1 | * | 6/2003 | Hong et al. | 369/13.01 |
| 2005/0201149 A1 | * | 9/2005 | Duan et al. | 365/185.03 |
| 2006/0030105 A1 | * | 2/2006 | Prinz et al. | 438/260 |
| 2006/0110883 A1 | | 5/2006 | Min | 438/260 |

OTHER PUBLICATIONS

U.S. Appl. No. 11/392,102, filed Mar. 28, 2006, entitled "Probe-Based Memory," by Kyu S. Min and Nathan R. Franklin.
U.S. Department of Energy Research News, "Nanocrystals: The Shape of Things to Come," Oct. 2001, pp. 1-3.

* cited by examiner

Primary Examiner—Joseph H Feild
Assistant Examiner—Nicholas Lee
(74) Attorney, Agent, or Firm—Trop, Pruner & Hu, P.C.

(57) ABSTRACT

In one embodiment, the present invention includes an apparatus having a conductive storage medium to store information in the form of electrostatic charge. The conductive storage medium can be disposed in a non-conductive layer that is formed over a charge blocking layer, which in turn may be disposed over an electrode layer. In one embodiment, a barrier layer may be disposed over the non-conductive layer. Other embodiments are described and claimed.

21 Claims, 3 Drawing Sheets

PROBE-BASED STORAGE DEVICE

BACKGROUND

Embodiments of the present invention relate to memory devices, and more particularly to memory devices implementing a probe-based storage and reading mechanism.

As semiconductor devices continue to evolve and shrink in size in advanced technology nodes, increasing storage densities can be realized using semiconductor memories. Such memories include flash-based storage memories in which information can be stored in a non-volatile manner in transistors of the semiconductor device. More specifically, charge may be stored in a floating gate of such a device. However, charge can leak out of the floating gate over time, as the floating gate is in proximity to various conductors to enable its writing and reading. Further, as transistors of such devices are enabled with lower threshold voltages, reading the correct information from the transistor can become difficult, and charge leakage issues can become exacerbated.

Furthermore, semiconductor memories such as flash-based devices have a significant portion of their total area devoted to addressing the memory array. That is, various row and column decoders, as well as row and column lines are connected to the memory array. Furthermore, these conductors that connect to the individual transistors of the memory array can also provide a path through which charge leakage can occur.

DETAILED DESCRIPTION

In various embodiments, a media stack may be provided to enable high density storage of information using probe-based writing and reading. More specifically, the media stack may include a conductive medium that can store charge provided by an electrical probe. Furthermore, the stack may include various non-conductive layers so that the stored charge cannot leak out of the conductive medium. The charge may be injected, e.g., using a tunnel electron injection method. To later read such injected charge, a non-contact read or sense mode may be implemented which may be based, for example, on deflection of the electrical probe due to the stored charge. While the scope of the present invention is not limited in this regard, in some embodiments the conductive storage medium may implement media of a nano-particle scale to enable high density storage. Furthermore, individual storage elements (i.e., of the conductive medium) may be charged at various charge levels to store, e.g., information of a first level or a second level (i.e., logic high and low values), or one of multiple charge levels may be injected into a conductive medium to enable multi-bit storage in a single charged element.

Figure 1:
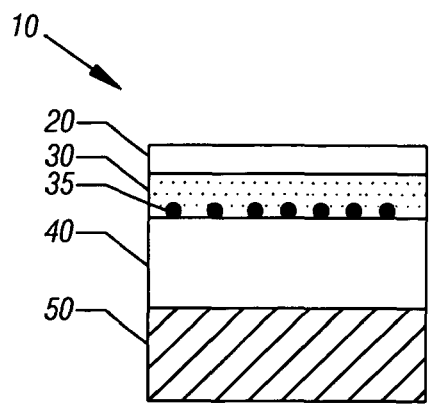
FIG. 1 is a cross section of a media stack in accordance with one embodiment of the present invention.

Referring now to FIG. 1, shown is a cross section of a media stack in accordance with one embodiment of the present invention. As shown in FIG. 1, media stack 10 may include a tunnel barrier layer 20 which is disposed over a non-conductive storage layer 30. Non-conductive storage layer 30 may include a conductive storage media 35. In one embodiment, conductive storage media 35 may be nano-particles present or formed in an insulation matrix, such as a nitride layer. Non-conductive storage layer 30 may be disposed over a charge blocking barrier layer 40, which in turn may be formed over a bottom electrode 50.

In various embodiments, tunnel barrier layer 20 may be an ultrathin layer of an oxide or nitride or carbon. Tunnel barrier layer 20 may allow for low electric field, tunneling while at the same time preventing non-conductive storage layer 30 from tunneling back during read operations. Tunnel barrier layer 20 may further prevent atmospheric exposure of media stack 10, which could result in diffusion of stored charge and/or material degradation. In various embodiments, tunnel barrier layer 20 may further act as mechanical protection against contact between a probe and non-conductive storage layer 30. While the scope of the present invention is not limited in this regard, tunnel barrier layer 20 may be formed of silicon nitride (SiN), silicon dioxide ($SiO_2$), aluminum oxide ($AlO_2$), or carbon (DLC) and may have a thickness of between approximately 1.0 and 10.0 nanometers (nm), in one embodiment.

As described above, non-conductive storage layer 30 may include a conductive storage medium 35 such as nano-particles embedded in an insulating matrix, e.g., of a nitride. However, other embodiments may implement other chargeable elements as a conductive medium. Such nano-particles may be in the sub 10 nm size regime, and may be metallic or insulator, so long as the electrical properties in conjunction with the surrounding matrix allow for charge carriers (i.e., electrons or holes) to be "trapped" for more than at least a few seconds. As examples, conductive storage medium 35 may include metal-based nano-particles and/or silicon-based nano-particles. For example, the metal nano-particles may include iron, nickel, platinum or cobalt-nano-particles, silicon-crystals, or another such particle. Such nano-particles may be formed in a spherical or another shape, or may be deposited on a substrate, e.g., via in-situ deposit in a vapor phase. In other embodiments, conductive elements may be formed by ion implantation into a sacrificial layer, with subsequent annealing and formation of a non-conductive layer. For example, vapor phase deposition of a thin (e.g., 0.5 nm to 5 nm) layer of metal onto charge blocking barrier layer 40, followed by heating (e.g., 100-300 Celsius) may be performed to form nano-particles. Non-conductive storage layer 30 may act as an electrical trap layer to prevent leakage or dissipation of charge laterally. In some embodiments, non-conductive storage layer 30 may be a nitride-based matrix in which conductive storage medium 35 is disposed. In various embodiments, non-conductive storage layer 30 may be formed of $SiO_2$, SiN or another such non-conductive material. In various embodiments, non-conductive storage layer 30 may thus prevent lateral transfer of charge from conductive storage medium 35.

As further shown in FIG. 1, non-conductive storage layer 30 may be disposed on charge blocking barrier layer 40, which may act to limit current passage between an electrical probe and a substrate (not shown in FIG. 1) during program/erase operations. In one embodiment, charge blocking barrier layer 40 may be formed of a similar material to that used for tunnel barrier layer 20, although the scope of the present invention is not limited in this regard. For example, in other embodiments a different material having a different dielectric constant (k) may be used to leverage differences in these materials for aiding in efficient injection and reading of charge. In one embodiment, charge blocking barrier layer 40 may be between approximately 10-30 nm, although the scope of the present invention is not limited in this regard.

Still referring to FIG. 1, bottom electrode 50 may be located below charge blocking barrier layer 40. Bottom electrode 50 may be formed of a selected conductive material such as one or multiple metals, e.g., aluminum, copper, titanium or the like. While not shown for ease of illustration in the embodiment of FIG. 1, bottom electrode 50 may be formed on a substrate, such as a silicon substrate. In one embodiment, bottom electrode 50 may have a thickness of between approximately 30 nm and 75 nm.

Using media stack 10, low voltage/low power operation may be realized. A media stack such as that of FIG. 1 may be used in various memory devices. For example, such a media stack may be used in a non-volatile memory for use in many different systems. Accordingly, memories of different form factors may be adapted for use in various system types, from server and desktop computers to notebook computers, personal digital assistants (PDAs), cellular telephones, portable media players and other mobile devices.

Figure 2:
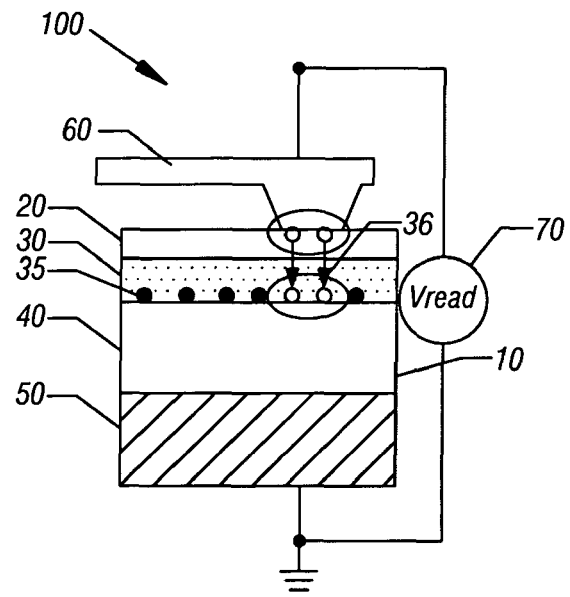
FIG. 2 is a cross section of a memory device in accordance with one embodiment of the present invention.

Referring now to FIG. 2, shown is a cross section of a memory device in accordance with one embodiment of the present invention. As shown in FIG. 2, memory device 100 may include a media stack 10, such as that shown in FIG. 1. In addition, an electrical probe 60 may be provided. As shown, electrical probe 60 is coupled to a voltage source 70, which is coupled between electrical probe 60 and a ground potential (also coupled to bottom electrode 50) to generate an electric field within media stack 10 to enable charge storage. While shown as being coupled to a ground potential, in other implementations bottom electrode 50 may be at a potential other than ground. In various embodiments, voltage source 70 may be one or multiple voltage sources to provide differing voltages for program, read, and erase operations. Electrical probe 60 may be a deflection-type or cantilevered probe that may include an array of atomically sharp probes that can be used to inject charge into non-conductive storage layer 30. In some embodiments, the array may include a large number of individual electrode tips. For example, an array having 100 to 1,000 such tips may be present, with each tip being adapted to inject charge into and sense charge from an addressed one (or more) of conductive storage media 35. Note that in various embodiments, electrical probe 60 may be moveable to address different individual storage elements within media stack 10.

Under sufficient tip bias, current may be injected from electrical probe 60 into non-conductive storage layer 30. More specifically, the electrons of the current may be electron tunneled into non-conductive storage layer 30 and may cause affected conductive storage media 35 to store charge, represented as charge retaining media 36. In the embodiment of FIG. 2, charge retaining media 36 may correspond to written bits (e.g., having a logic value of 0 or 1, depending on charge level). While the scope of the present invention is not limited in this regard, a programming voltage may be in the range of approximately 2.0-5.0 volts. Furthermore, different voltage levels may be provided to write different data values into conductive storage medium 35. For example, each element of conductive storage medium 35 may store a single bit of information, e.g., as represented by a zero or one logic level value, based on a charge value. For example, in some embodiments a positive programming voltage may store a logic one value, while a corresponding negative programming voltage may store a logic zero value, although other implementations are possible. Furthermore, in some implementations multi-level storage within a single element of conductive storage medium 35 may be realized. For example, a plurality of different charge levels may be possible, e.g., as generated by different programming voltages. In this way, each element of conductive storage medium 35 may store, for example, one of four charge levels (e.g., representing two bits having values of 00, 01, 10, and 11) depending on a charge level injected.

Accordingly, programming of memory device 100 may be implemented by providing a program voltage from voltage source 70 to electrical probe 60, which then enables tunneling electrons via contact of electrical probe 60 with tunnel barrier layer 20 to inject the charge into non-conductive storage layer 30. Due to the properties of media stack 10, when charge is injected into non-conductive storage layer 30, the charge may remain, e.g., via statically charged retaining media 36, providing non-volatile storage.

Figure 3:
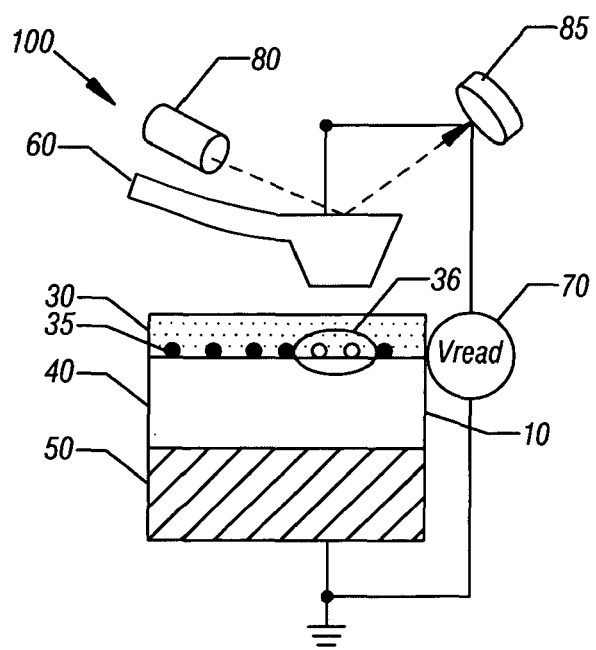
FIG. 3 is a block diagram representing a read operation in a memory device in accordance with one embodiment of the present invention.

Then at a later time, stored information may be read out of memory device 100. While various manners of reading the stored information represented by the stored charge in non-conductive storage layer 30 may occur, in various embodiments a non-contact read mode may be performed. Referring now to FIG. 3, shown is a block diagram representing a read operation in accordance with one embodiment of the present invention. As shown in FIG. 3, during a read operation, a read voltage may be applied to electrical probe 60 from a voltage source 70. This read voltage may be a so-called nulling voltage to cancel out the effects of the deflection force on electrical probe 60 caused by charge retaining media 36. That is, in a read operation, the tip of electrical probe 60 may be deflected as it is passed over charge retaining media 36.

Based on the stored charge, the tip may be attracted or repelled, and the amount of this deflection can be measured using a detector. Specifically, as shown in FIG. 3, a detector may include a deflection detector 85 that measures deflection of electrical probe 60 via a laser source 80 that is reflected off of electrical probe 60 to deflection detector 85. Thus, electrostatic field may be sensed in a non-contact manner. Note that because the deflection force may be relatively small, in some embodiments electrical probe 60 may be oscillated and a change in the induced oscillation of electrical probe 60 may be measured to determine charge storage level and thus the information present. In some embodiments, the amount of detected deflection may be provided to a lookup table such as a non-volatile storage that may store data values corresponding to different deflection levels to thus output the data levels stored in charge retaining media 36. However, understand that non-contact sensing may be realized in other manners such as capacitance changes and so forth.

Thus embodiments of the present invention may provide for ultra-high density of data storage. For example, in some implementations a storage pitch of approximately 15 nm may be realized. Furthermore, using a media stack in accordance with an embodiment of the present invention, charge loss may be prevented in all directions so that a non-volatile storage may permanently retain its charge without the need for either refreshing or loss of data. Still further, a media stack in accordance with an embodiment of the present invention may be read in a wear-free manner, as an electrical probe can sense the data in a non-contact mode. In this way, both the media stack and the probe may be wear-free, allowing for extended use.

Figure 4:
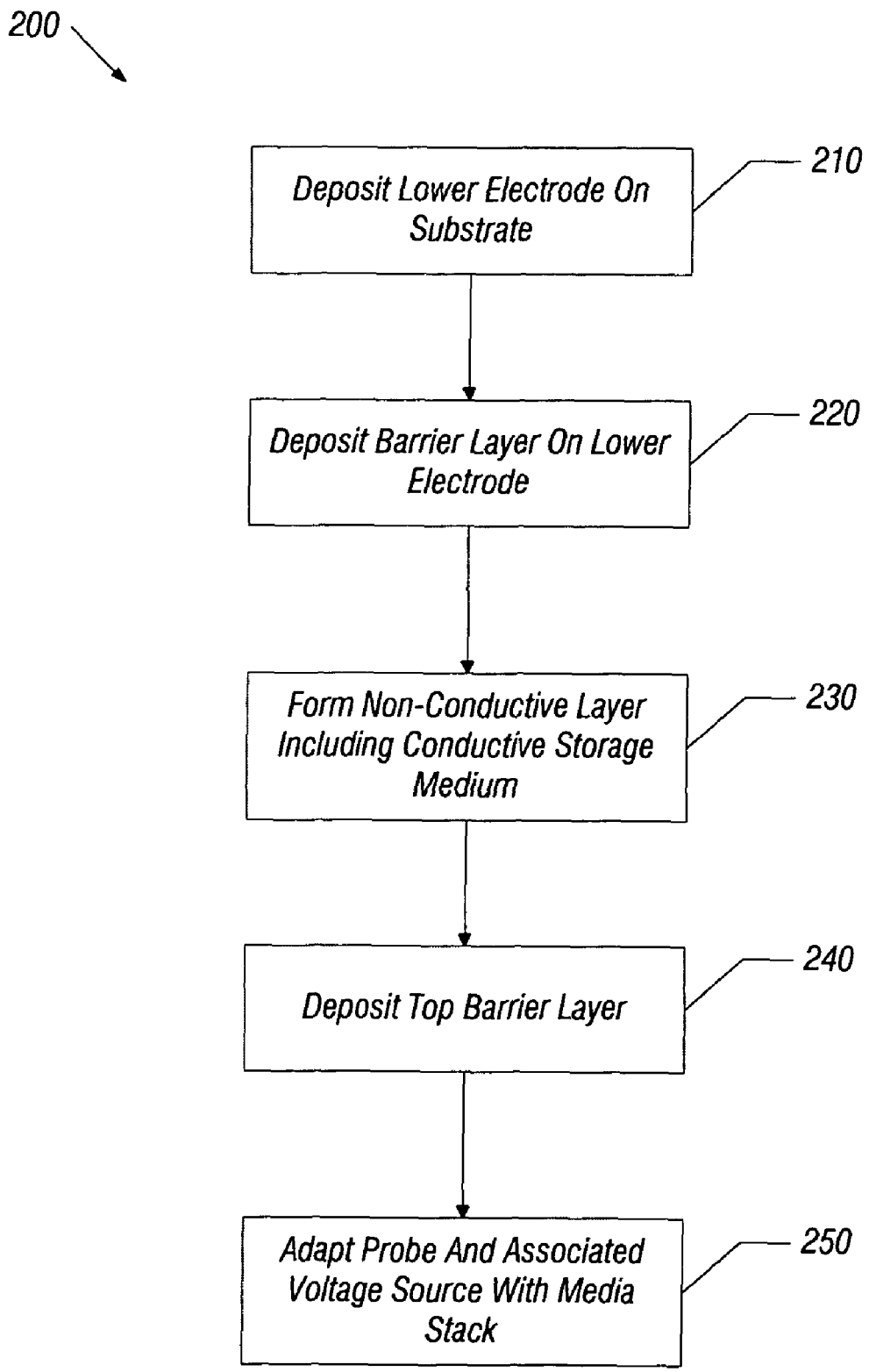
FIG. 4 is a flow diagram of a method of forming a media stack in accordance with an embodiment of the present invention.

It is to be understood that a media stack can be formed in many different manners. In some implementations, various semiconductor processing techniques may be used to form a media stack on a substrate such as a silicon-based or other such substrate. Referring now to FIG. 4, shown is a flow diagram of a method of forming a media stack in accordance with an embodiment of the present invention. As shown in FIG. 4, method 200 may begin by depositing a lower electrode on a substrate (block 210). For example, a metal layer may be deposited on a silicon substrate, a silicon-on-insulator substrate or another type of substrate in a desired manner, such as via a deposition process (e.g., a chemical vapor deposition (CVD) process), an electroplating process or so forth. Next, a barrier layer may be deposited on the lower electrode (block 220). The barrier layer may be formed, e.g., via CVD or in another manner. This layer may be used to prevent transfer of charge from charge storage particles of a conductive storage medium.

Still referring to FIG. 4, at block 230, a non-conductive layer may be formed on the barrier layer. This non-conductive layer may include the conductive storage medium. For example, different manners of providing this layer may be possible. In some embodiments, nano-particles or another conductive storage medium may be placed in a matrix, i.e., an insulation matrix, and formed on the barrier layer. In other embodiments, conductive storage elements such as nano-particles or other particles may be positioned on the barrier layer and an insulation layer deposited thereon. Note that in different implementations, the conductive storage medium may be deposited directly on the barrier layer or may be positioned within a matrix or other material that is used for the non-conductive layer.

Over this non-conductive layer, a top barrier layer may be deposited (block 240). For example, in some implementations a barrier layer having a similar material to that of the lower barrier layer, albeit with a much thinner profile may be deposited to provide the ability for charge to be injected via electron tunneling into the charge storage media, while preventing later charge leakage. In this way, a media stack may be formed using various semiconductor processing techniques.

To obtain a memory device using such a media stack, a probe and associated electronics such as a voltage source may be adapted with the media stack (block 250). For example, a probe including an array of probe tips, each of which may provide charge into the media stack and sense information in a non-contact mode may be adapted with the media stack. Furthermore, this probe may be coupled to a voltage source, such as a current generator or other voltage source to provide a charge source for programming, read, and erase operations. While shown with this particular embodiment in FIG. 4, the scope of the present invention is not limited in this regard.

Figure 5:
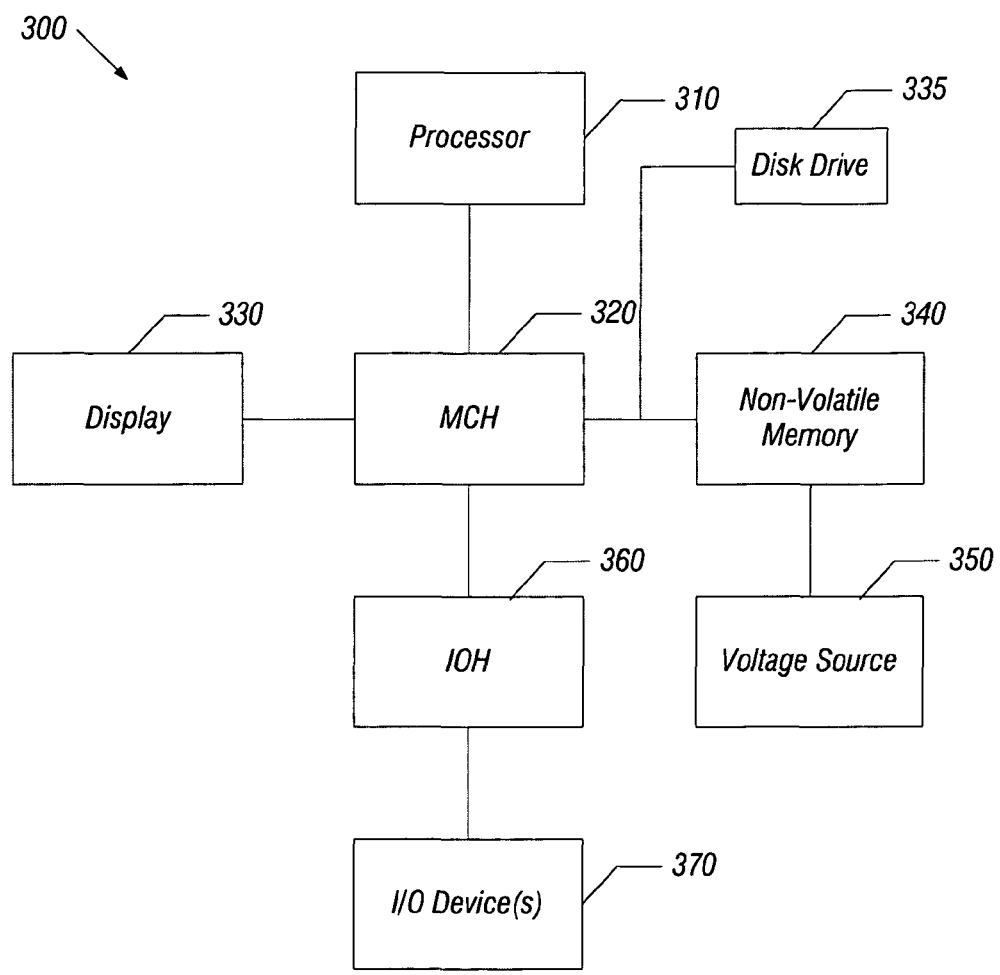
FIG. 5 is a block diagram of a system in accordance with one embodiment of the present invention.

A memory device formed in accordance with an embodiment of the present invention can be used in many different system types. For example, a memory device may be used in portable devices, personal computers and so forth. Referring now to FIG. 5, shown is a block diagram of a system in accordance with one embodiment of the present invention. As shown in FIG. 5, system 300 may be a personal computer including a processor 310, which may be a general-purpose processor. Processor 310 is coupled via a memory controller hub (MCH) 320 to an input/output hub (IOH) 360 that in turn may be coupled to one or more input/output (I/O) devices 370.

As further shown in FIG. 5, MCH 320 may be coupled to a display 330, which may be a liquid crystal or flat panel display, in various implementations. Furthermore, MCH 320 is coupled to both a mass storage device such as a disk drive 335 and a non-volatile memory 340, which in the embodiment of FIG. 5 may include a media stack in accordance with an embodiment of the present invention. To enable read, writing and erasing operations within non-volatile memory 340, a voltage source 350 may be coupled thereto. While shown with a single voltage source in the embodiment of FIG. 5, it is to be understood that multiple such voltage sources may be present, each of which can provide one or more voltages used for injecting different charge levels to provide storage of different data values, as well as different voltages used for programming, reading and erase operations. While shown with this particular implementation in the embodiment of FIG. 5, the scope of the present invention is not limited in this regard.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a conductive storage medium to store information in the form of electrostatic charge, the conductive storage medium disposed in a non-conductive layer;
a charge blocking layer disposed below the non-conductive layer;
an electrode layer disposed below the charge blocking layer, wherein the electrode layer is formed on a substrate;
a tunnel barrier layer disposed above the non-conductive layer; and
an electrical probe to inject charge into the conductive storage medium to write the information into the conductive storage medium by injection of charge through the tunnel barrier layer and into the conductive storage medium.

2. The apparatus of claim 1, wherein the electrical probe is to contact the tunnel barrier layer during injection of the charge.

3. The apparatus of claim 1, wherein the electrical probe is to read at least some of the information from the conductive storage medium by sensing of an electrostatic field in a non-contact mode.

4. The apparatus of claim 3, further comprising a detector to detect deflection of the electrical probe in the non-contact mode via a laser source reflected off the electrical probe.

5. The apparatus of claim 3, wherein the electrical probe is to be oscillated during a read operation and the detector is to measure a change in the induced oscillation of the electrical probe.

6. The apparatus of claim 1, further comprising at least one voltage source coupled to the electrical probe and the electrode layer to provide a write voltage to store the information in the conductive storage medium.

7. The apparatus of claim 1, wherein the conductive storage medium comprises nano-particles, and wherein the non-conductive layer comprises an insulation matrix in which the nano-particles are embedded.

8. The apparatus of claim 7, wherein each nano-particle is to store at least one data element of the information.

9. The apparatus of claim 1, wherein the electrical probe includes an array of probes formed of individual electrode tips each adapted to inject the charge into a conductive storage media of the conductive storage medium.

10. The apparatus of claim 1, wherein the electrical probe is to inject one of a plurality of charge levels into a single element of the conductive storage medium to store information corresponding to a plurality of bits.

11. The apparatus of claim 1, wherein each element of the conductive storage medium is to store one of a plurality of charge levels to represent a multiple bit value depending on a charge level injected by the electrical probe.

12. A method comprising:
    positioning conductive storage elements in a non-conductive layer located on a substrate; and
    forming the substrate on a conductive layer, wherein the substrate comprises a charge blocking layer formed over an electrode layer;
    forming a barrier layer over the conductive storage elements, wherein the barrier layer is to allow tunneling of electrons from the probe to the conductive storage elements through the barrier layer during a programming operation.

13. The method of claim 12, wherein the conductive storage elements comprise nano-particles and the non-conductive layer comprises an insulating matrix in which the nano-particles are embedded.

14. The method of claim 12, further comprising adapting the probe with a media stack comprising the conductive storage elements, the substrate and the barrier layer.

15. The method of claim 12, wherein each of the conductive storage elements is to store charge corresponding to a plurality of bits.

16. A system comprising:
    a processor;
    a non-volatile memory coupled to the processor, the non-volatile memory having a media stack and a probe in moveable relation to the media stack, wherein the probe is to write information into the media stack in a contact mode and to read at least some of the information from the media stack in a non-contact mode, the media stack comprising a conductive storage medium to store the information as electrostatic charge, the conductive storage medium disposed in a non-conductive layer, a charge blocking layer disposed below the non-conductive layer, a tunnel barrier layer disposed above the non-conductive layer, and an electrode layer disposed below the charge blocking layer, wherein the electrode layer is formed on a substrate, the probe including an array of probes formed of individual electrode tips each adapted to inject charge into a single element of the conductive storage medium, wherein each of the single elements is to store a plurality of bits of the information; and
    a mass storage device coupled to the processor.

17. The system of claim 16, wherein the conductive storage medium comprises nano-particles and the non-conductive layer comprises an insulation matrix.

18. The system of claim 16, wherein the probe is to inject the charge by electron tunneling through the tunnel barrier layer and into the conductive storage medium.

19. The system of claim 16, further comprising a detector to detect deflection of the probe in the non-contact mode.

20. The system of claim 19, wherein the detector is to detect deflection of the probe via a laser source reflected off the probe.

21. The system of claim 19, wherein the probe is to be oscillated during a read operation and the detector is to measure a change in the induced oscillation of the probe.

* * * * *